Patented Sept. 20, 1932

1,878,137

UNITED STATES PATENT OFFICE

WINFRID HENTRICH AND LUDWIG ZEH, OF WIESDORF NEAR COLOGNE, GERMANY, ASSIGNORS TO GENERAL ANILINE WORKS, INC., OF NEW YORK, N. Y., A CORPORATION OF DELAWARE

COMPLEX INNER ORGANO-IRON COMPOUNDS AND PROCESS OF PREPARING THE SAME

No Drawing. Application filed December 8, 1926, Serial No. 153,458, and in Germany December 22, 1925.

This invention relates to complex inner organo-iron compounds, containing iron, which are admirably suited for use in the preparation of lakes and to the process of making such compounds which consists generally in treating an isonitroso compound of an acidyl acetic acid arylamide, its derivatives and substitution products, with an iron compound, particularly ferrous compounds, or salts. These complex inner organo-iron compounds which may be represented by the probable general formula:

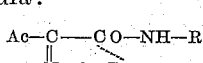

wherein Ac stands for an acetyl or a benzoyl group, R stands for an aromatic nucleus, which may be substituted by alkoxy, halogen or a carboxylic acid group, the dotted bond between the iron atom and the oxygen of the carbonyl group representing a secondary valence, this type of compounds being described in "Pfeiffer, Organische Molekuelverbindungen," 1922, page 188 et seq., may be converted into lakes possessing excellent fastness properties to water and light by the well known and customary methods of forming lakes.

The following example will serve to illustrate the invention:

*Example.*—258 parts by weight of the sodium compound of isonitroso-acetoacetyl-2-anisidide, which may be represented by the formula:

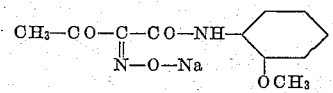

are dissolved in 500–800 volumes of water at 30–40° C. and while stirring an aqueous solution of 139 parts by weight of crystalline ferrous sulphate is entered in the customary manner. The complex inner iron compound of the isonitroso compound which may be represented by the formula:

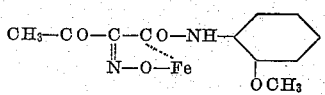

immediately separates as a completely insoluble deep blue precipitate. The precipitate is filtered off and combined with the customary substrata used in the manufacture of colors for wall paper dyeing and printing. In this manner a beautiful greenish-blue lake is obtained possessing good fastness properties to water and light as a size color or as a printing color.

The isonitroso-acetoacetyl-2-anisidide used as starting material is prepared by causing a solution of the calculated quantities of acetoacetyl-2-anisidide, caustic soda lye and sodium nitrate, to flow into 20% sulphuric acid in the presence of ice. After prolonged stirring at a temperature of 0° C. to 10° C., the precipitate is filtered and well washed and then dissolved in dilute caustic soda lye at ordinary temperature whereupon the resulting yellow solution is salted out.

Iron lakes of similar shades and properties are obtained, when the isonitroso-acetoacetyl-2-anisidide is replaced by isonitroso-acetoacetanilide or by isonitroso-acetoacetyl-2-chloro-anilide or by isonitroso-acetoacetanilide-4-carboxylic acid or by isonitroso-benzoyl-acetic acid-2-anisidide.

Having now particularly described and ascertained the nature of our said invention and in what manner the same is to be performed, we declare that what we claim is:

1. Process of making complex inner organo-iron compounds which comprises treating a water-soluble isonitroso compound of an acidyl acetic arylamide with a ferrous salt in aqueous solution.

2. Process of making the complex inner isonitroso-iron compound, which may be represented by the formula:

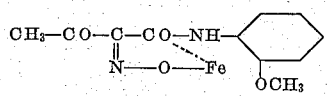

which comprises treating the sodium compound of isonitroso-acetoacetyl-2-ansidide, which may be represented by the formula:

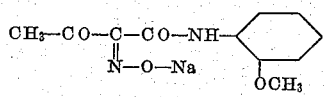

with ferrous sulfate in the presence of water.

3. As new products, the complex inner organo-iron compound of an isonitroso acidyl acetic acid aryl amide of the probable general formula:

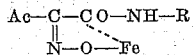

wherein Ac stands for an acetyl or benzol radical, R stands for an aromatic nucleus, which may be substituted by alkoxy, halogen or a carboxylic acid group, being generally dark blue to bluish black, water-insoluble substances which are suitable for the manufacture of size and printing colors.

4. As a new product, the complex inner organo-iron compound which may be represented by the formula:

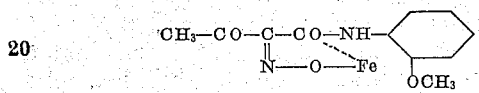

being a greenish-blue lake which is suitable for the manufacture of size and printing colors.

5. As new products, the complex inner organo-iron compound of an isonitroso acidyl acetic acid aryl amide of the probable general formula:

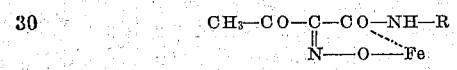

wherein R stands for a benzene nucleus which may be substituted by alkoxy, halogen or as carboxylic acid group, being generally dark blue to bluish black, water-insoluble substances which are suitable for the manufacture of size and printing colors.

In testimony whereof, we affix our signatures.

WINFRID HENTRICH.
LUDWIG ZEH.